INVENTORS
RICHARD L. WACHTELL
EDWARD C. PALMENBERG

Nov. 23, 1971   R. L. WACHTELL ET AL   3,621,700
STRAIGHTENING OF GUIDE VANES
Filed March 9, 1970   4 Sheets-Sheet 5

INVENTORS
RICHARD L. WACHTELL
EDWARD C. PALMENBERG by
Sandoe, Hopgood & Calimafde
ATTORNEYS 3,621,700
STRAIGHTENING OF GUIDE VANES
Richard L. Wachtell, Tuxedo Park, N.Y. 10987, and Edward C. Palmenberg, 72 Briar Road, Nanuet, N.Y. 10954
Filed Mar. 9, 1970, Ser. No. 17,689
Int. Cl. B21k 3/04
U.S. Cl. 72—309
8 Claims

ABSTRACT OF THE DISCLOSURE

A method and apparatus are disclosed for restoring distorted guide vanes to their original shape for proper location and performance in a final vane assembly. A heated airfoil section having locating buttresses at opposite ends thereof is clamped under pressure between a pair of heated dies having contoured working surfaces defining the desired airfoil shape, with the buttresses of the vane extending freely outside the dies. The pressure is maintaind on the airfoil until it has conformed to the configuration defined by the dies and, while maintaining the pressure on the airfoil, the freely extending buttresses are then oriented relative to the airfoil section to the correct attitude required for proper location of the vane in the final vane assembly.

---

This invention relates to the restoration of distorted vanes and, in particular, to a method and apparatus for straightening guide vanes comprising an airfoil section having locating buttresses at opposite ends thereof.

BACKGROUND OF THE INVENTION

Nozzle guide vanes in jet engines are subjected in service to aggravated high temperatures and aerodynamic loading conditions over long periods of time as a result of which deformation and distortion of the airfoil section occur relative to reference mounting surfaces, e.g., relative to the locating buttresses of the vanes. In order to restore the vane part to its original shape and proper locating geometry, a hot forging technique is employed involving the use of a multiple cylinder hydraulic press employing heated precision shaped dies whose contoured working surfaces, when clamped together about an airfoil section, define the desired shape to be achieved.

The restoration operation employed in conventional practice resides in the use of heated contoured dies suitably oriented and restrained by means of die holders so as to provide an airfoil shape having the proper attitude with respect to the locating surfaces, such as the locating buttresses at the opposite ends of the airfoil section. The restoration is normally achieved in a die closing cycle where the die assembly opens to receive the vane, clamps the locating surfaces (the buttresses) between references and then closes the dies onto the airfoil section. Shimming the die blocks to effect straightening and rotation of the blocks results in opening or closing of the apparent nozzle throat area. The disadvantage of this method is that it relies on the actual vane dimensions, including the buttresses, for referencing during hot forming of the part and, because of this, it is difficult to insure accurate seating of the die uniformly on the vane to be straightened.

The foregoing difficulty is overcome by means of the invention as will be apparent from the following dislosure and the accompanying drawings, wherein.

GENERAL DISCLOSURE OF THE INVENTION

Figure 1:
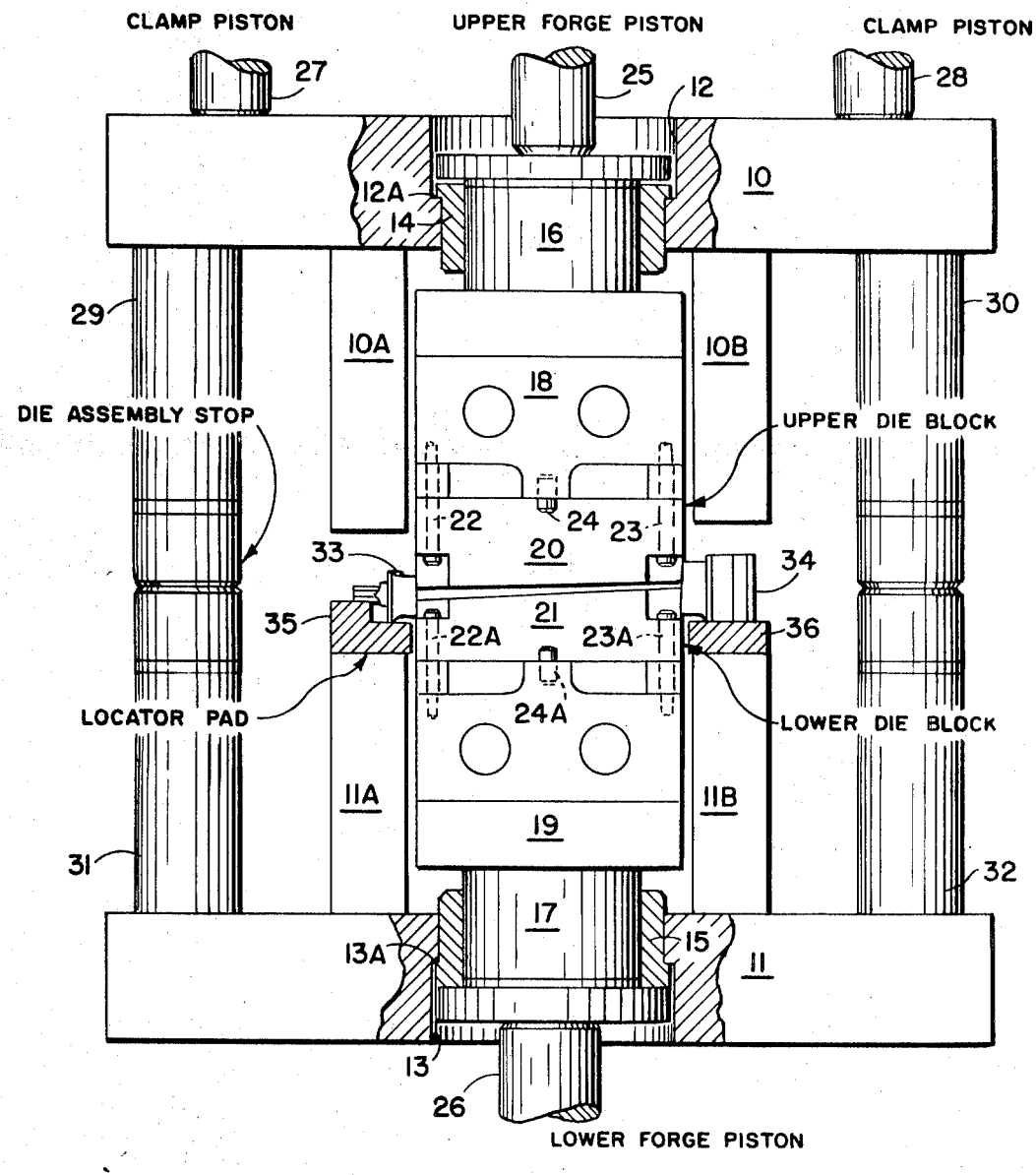
FIG. 1 is a detail rendition of the essential parts of one embodiment of the hydraulic press which may be employed in carrying out the restoration cycle.

Stating it broadly, the novel aspects of the invention reside in a more simplified restoration cycle in which only the airfoil section is gripped during the straightening cycle so that the airfoil section is straightened first, following which during the period the airfoil section is still under pressure, the buttresses are oriented to their correct position relative to the straightened airfoil section. Thus, the ultimate referencing is determined by the airfoil section itself and not initially by the use of positive stops applied to the buttresses as normally employed conventionally. The novel method employed enables the heated dies to seat on the airfoil section as it exists instead of at some predetermined position. This is desirable because part tolerance levels are of sufficient magnitude to prevent setting of positive stops in a manner which is suitable for all parts, since each vane is formed differently from the other. By carrying out the steps of the cycle sequentially with respect to time during the application of pressure so that the proper dwell is obtained during each part of the cycle, the straightening is achieved expeditiously and simply, particularly at each of two specific steps, to wit: (1) the step of first reforming the airfoil to the correct shape and profile without simultaneously indexing the position of the locating buttresses, and (2) the next step of orienting the locating buttresses to the straightened or corrected airfoil, these steps being individually controlled.

One embodiment of the invention broadly stated resides in a method for restoring a distorted vane to its original shape for proper location in a final vane assembly, the vane comprising an airfoil section having locating buttresses at opposite ends thereof which comprises, clamping the airfoil section of a heated vane under deforming pressure between heated opposed contoured dies having contoured working surfaces defining the desired airfoil shape with the buttresses of the vane extending freely outside the clamped dies, the closure of the dies being determined by the die configuration and the shape and thickness of the airfoil section in the die, maintaining the deforming pressure on the heated vane until the airfoil thereof has conformed to the airfoil configuration defined by the dies in the clamped position and then, while maintaining the airfoil section under pressure between the dies, orienting the freely extending buttresses relative to the corrected airfoil section to the attitude required for proper location of the vane in the final vane assembly. Positive indexing stops are provided which limit the override of the contoured dies.

In its more specific aspects, the method comprises providing a pair of moveably opposed heated upper and lower contoured dies whose working faces when clamped together define the contour of the desired airfoil shape, the lower die having separately positioned on each side thereof locator pads for locating and indexing each of said opposed buttresses to the desired attitude during a restoration cycle, placing a heated vane on the heated lower die with the dies in open position and with the buttresses of said vane extending freely outside the confines of the die, the lower die being raised relative to the locator pads to allow clearance between the extending buttresses of the vane and said locator pads during the airfoil straightening step, clamping the airfoil section of the heated vane under deforming pressure between the upper and lower dies, the clamping of the dies being determined by the die configuration, maintaining deforming pressure on the airfoil section until the heated airfoil section has been restored to the desired configuration defined by the contoured dies in the clamped position, causing the clamped dies to move as an assembly towards the locator pads until the extending buttresses are pressed against the locator pads and are oriented to the desired attitude relative to the airfoil section, and then separating the dies and removing the restored vane therefrom. Opposing upper and lower locator pads may be employed so that when the clamped dies move as an assembly to the lower locator pads, upper locator pads are brought down with the upper dies, whereby, at the end stroke the buttresses are clamped between upper and lower locator pads.

DETAIL ASPECTS OF THE INVENTION

As illustrative of one embodiment of a multiple cylinder hydraulic press that can be employed in carrying out the invention, reference is made to FIG. 1 which shows a pair of spaced platens 10 and 11, mounted on supports (not shown), the platens having centrally located openings 12 and 13 provided internally with annular shoulders 12A, 13A for supporting journals 14 and 15. Platen 10 has extending downward from it, locator pad supports 10A, 10B; while platen 11 has upwardly extending locator pad supports. The journals have slidably mounted in each stub shaft 16 and 17, respectively, shaft 16 being integral with die holder 18, and shaft 17 being integral with die holder 19. Die holder 18 is connected to upper die block 20 by means of bolts 22, 23 and centering pin 24, the connection being such as to provide some articulation of the die block to insure adequate seating between the die block and the workpiece.

Die holder 19 is similarly connected in articulation relationship to lower die block 21 via bolts 22A, 23A and centering pin 24A.

Figure 6A:
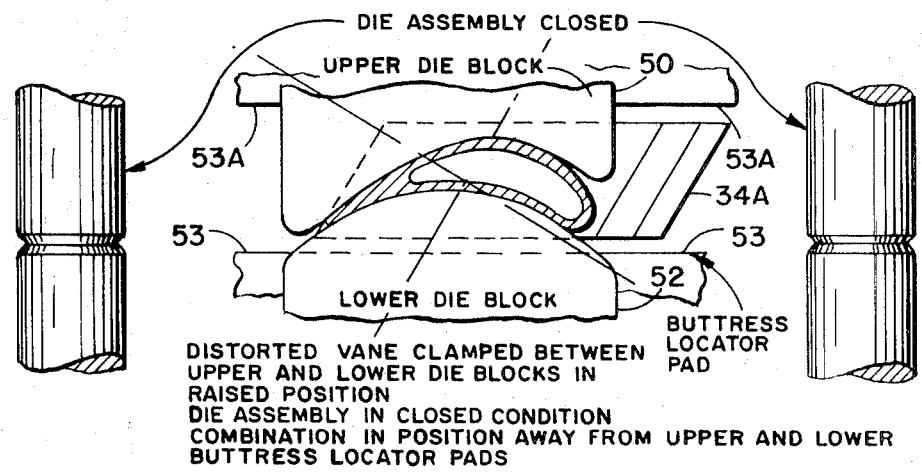
FIGS. 6A and 6B illustrate another embodiment which may be employed in straightening the airfoil section and, in particular, the butresses thereof.
Figure 6B:
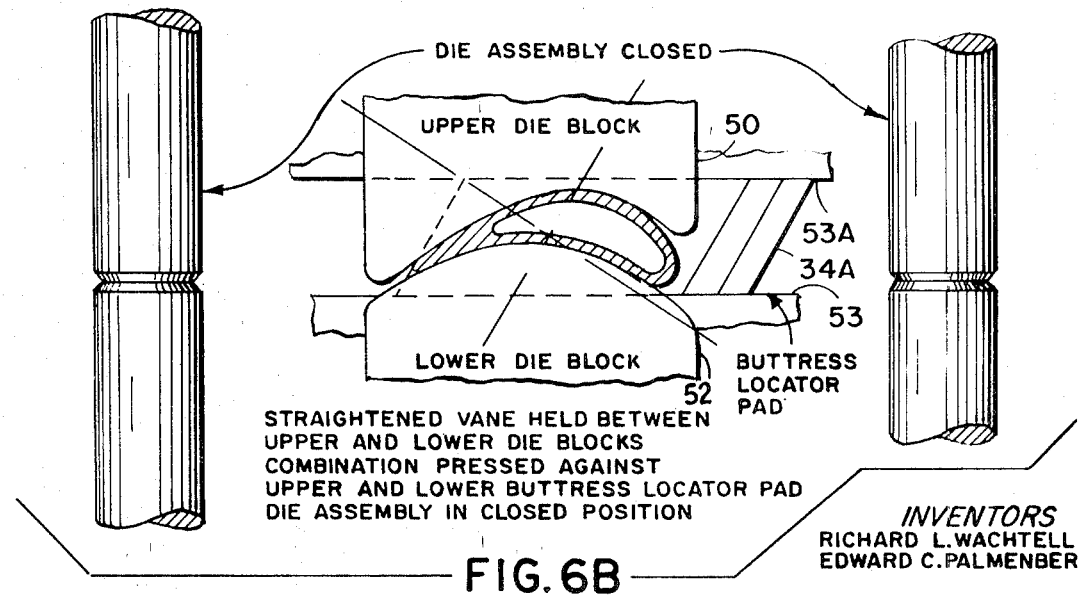
Figure 6:
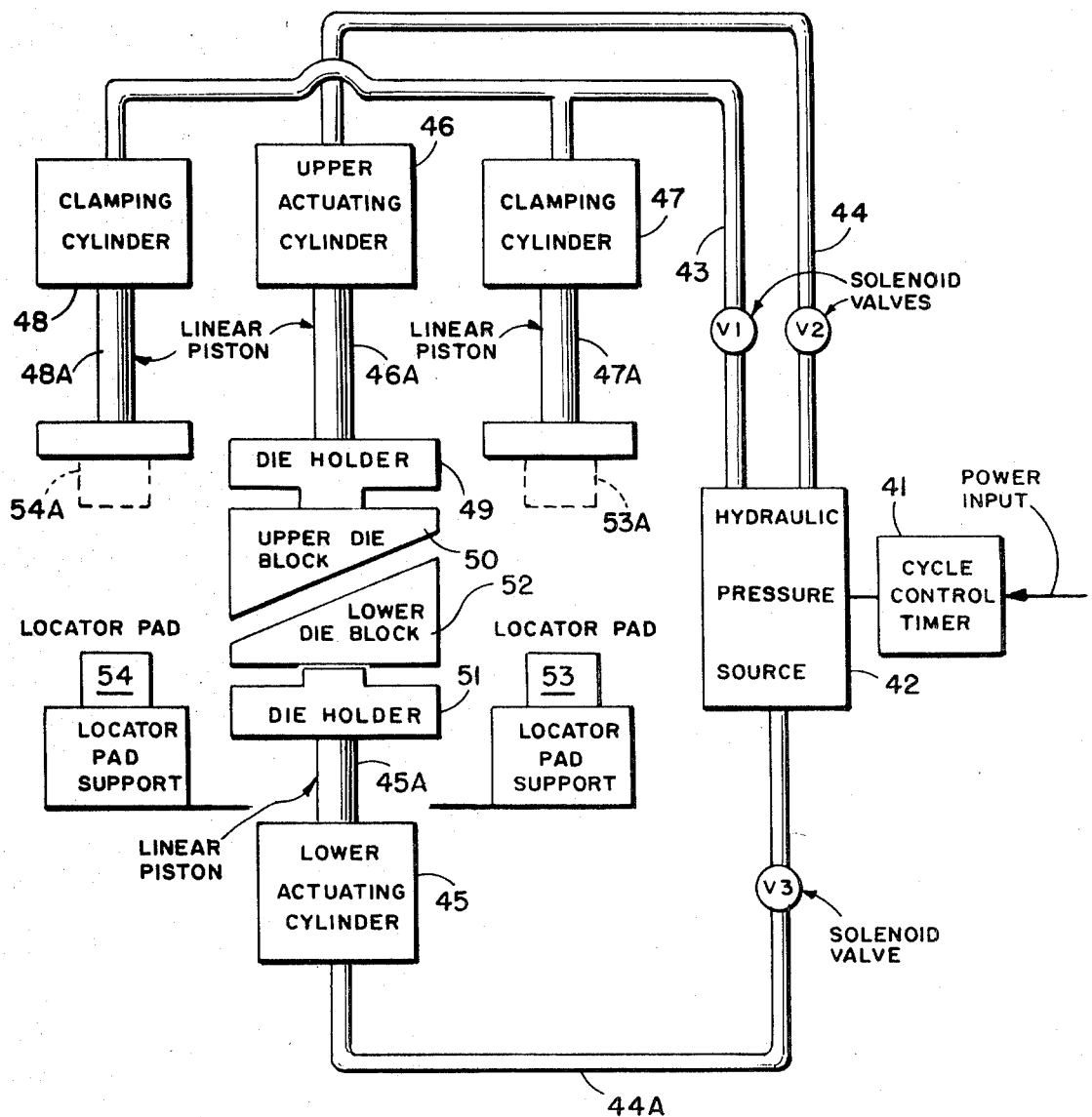
FIG. 6 represents schematically one embodiment of the apparatus for carrying out the invention.

The upper and lower die blocks are actuated into the forging position relative to vane "V" via upper forge piston 25 and lower forge piston 26 through hydraulic cylinders not shown (note, however, the schematic of FIG. 6). The upper die is brought into clamping position with the lower die via clamping pistons 27 and 28 (operable by means of hydraulic cylinders not shown), die assembly stops being provided in the form of downwardly extending columns 29, 30 which are adapted to abut corresponding upwardly extending columns 31 and 32. Hydraulic pressure is applied to the dies via upper and lower forge pistons 25 and 26 to effect straightening of the airfoil section. Locator pads 35 and 36 are provided on supports 11A and 11B on each side of lower die 21 against which vane buttresses 33 and 34 are oriented during the final restoration step. Upper locator supports 10A and 10B may have locator pads integral therewith similar to 35 and 36.

FIGS. 2 to 5 show schematically each step of the restoration cycle, equivalent parts being designated by the same numerals as in FIG. 1, only those parts being shown essential to understanding the process.

Figure 2:
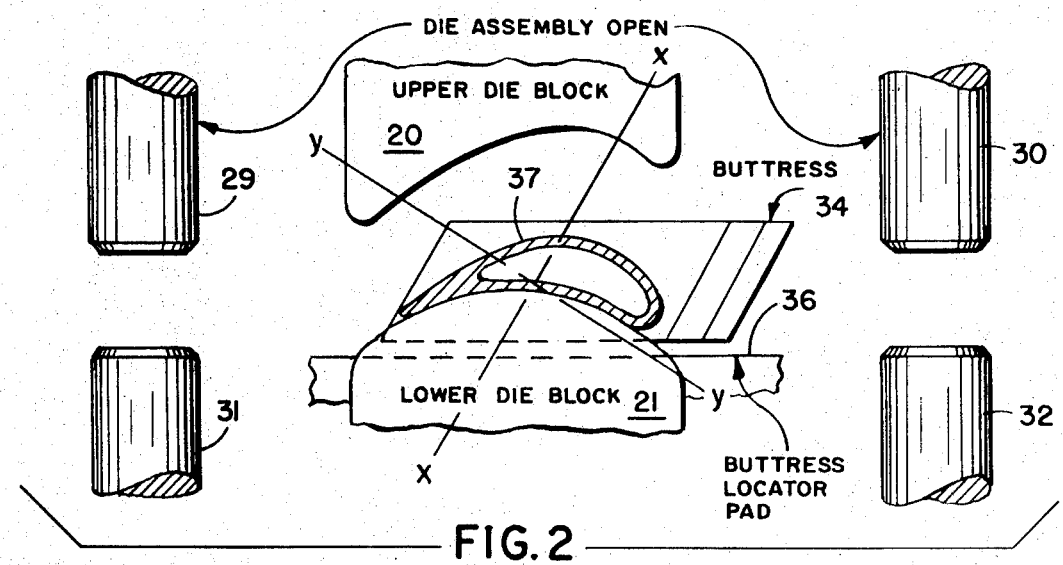
FIGS. 2 to 5 are illustrative of the various stages or steps which make up the restoration cycle.

Referring to FIG. 2, the die assembly is shown open or in home position, the stops 29 and 30 being depicted separated from lower stops 31 and 32. The heated vane is placed on lower die 21 in the raised position due to the action of piston 26, only the airfoil section 37 being supported by the die, with buttress 34 extending freely outside of the die. Since the airfoil is shown in cross section, the other buttress 33 is not visible in the drawing. The lower die is in the raised or home position to receive the part and to allow buttress 34 to be supported clear of buttress locator pad 36. The position of the airfoil part on the lower die is indicated by axes X—X and Y—Y.

Figure 3:
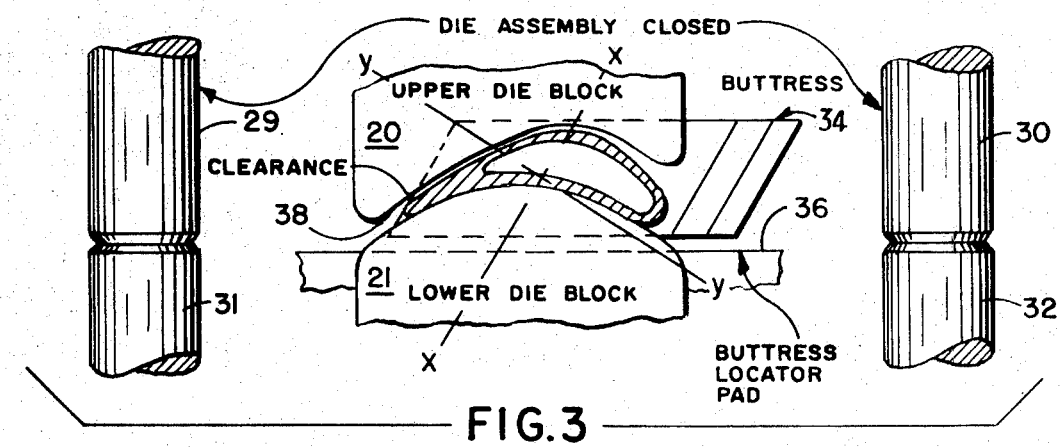

Upon actuation of the cycle, the die assembly is allowed to close against the stops as shown in FIG. 3, thus establishing the location of upper and lower die blocks in space with proper alignment. As will be noted, at the stop setting, clearance 38 is provided between upper die 20 and the upper surface of the airfoil section. The lower die remains fixed in the raised or home position under the influence of pressure in the lower actuating cylinder shown schematically in FIG. 6.

Figure 4:
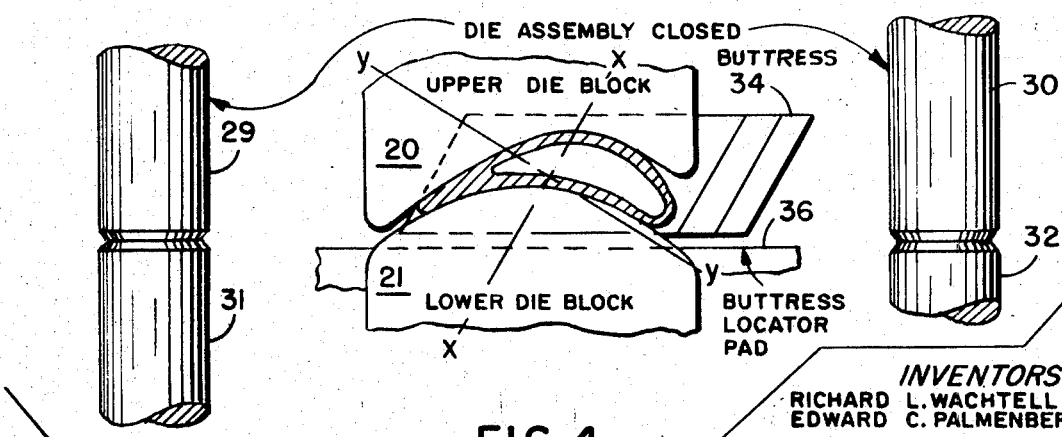

In FIG. 4, the upper heated die block 20 is driven downward under controlled cylinder pressure (note FIG. 6) to take up clearance 38 and until the airfoil section is clamped between upper and lower heated die blocks. This forged position is maintained under pressure for a suitable time until the airfoil section is reformed to the configuration of the contoured blocks.

Figure 5:
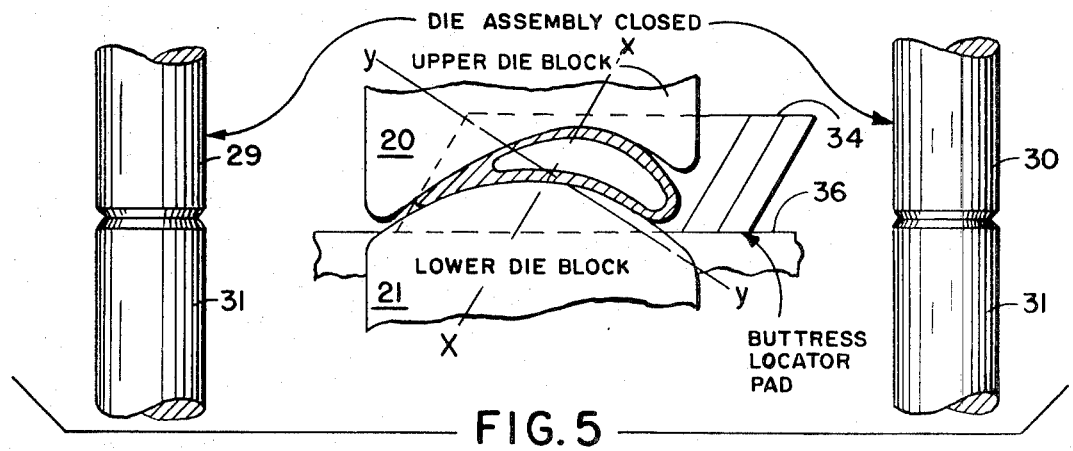

Following the foregoing forging step, the pressure in the cylinder holding the lower die block in place is reduced, allowing the upper cylinder to drive both die blocks as an assembly downward at a controlled rate, while still maintaining a clamping force on the airfoil section (note FIG. 5). Thus, the airfoil section which is continually held between the die blocks under pressure is driven downward so that mounting reference surfaces (e.g. the buttresses) are pressed against locator pad 36 set at the attitude to orient the buttress to the position required for proper location in the final vane assembly.

As will be noted, the airfoil section is first straightened and the buttresses are then oriented to the correct attitude relative to the straightened airfoil section. The buttresses of the vane are maintained in the position against the locator pads until they are re-oriented as desired. After a predetermined time in this position, the sequential operation continues wherein the press cycle is halted, the die assembly opened or returned to home position and the part removed. The novelty of this method is that it does not rely on actual part dimensions for referencing, the forging pressure being applied directly to the airfoil section being reformed, following which the freely extending buttress is then oriented relative to the reformed airfoil section.

By employing the broadly stated dual cycle type of operation, the airfoil is straightened and caused to be rotated as desired between the contoured faces of the articulated dies without the influence of restraint normally created by distorted buttresses. By maintaining the buttresses in freely extending or floating position outside of the dies, they can thereafter be restored to the proper attitude without interference with the straightened airfoil section.

Adjustment for apparent nozzle throat area is produced by allowing more or less force to be applied between the upper and lower heated die blocks by adjusting the hydraulic pressure. A simple servo type follow-up system can be employed to track the airfoil motion and make such adjustments as required to produce a given shape.

FIG. 6 shows schematically how a press cycle can be programmed using a cycle control timer coupled to hydraulic fluid reservoir or source 42 for providing the sequencing and motivating pressure required to exert forces through cylinders 45, 46, 47 and 48. In operation, solenoid actuated valves V1, V2 and V3 in lines 43, 44 and 44A are used for controlling the flow of fluid to hydraulic cylinders 45, 46, 47 and 48; cylinders 45 and 46 having upper and lower pistons 46A and 45A, respectively, coupled with respect to piston 46A to die holder 49 of upper die 50 and also coupled with respect to lower piston 45A to die holder 51 of lower die 52. Buttress locator pads 53 and 54 are disposed on each side of lower die 52, the lower die in home position being slightly above the pads. Clamping cylinders 47 and 48 may have locator pads shown phantomly by numerals 53A and 54A for gripping opposing pads 53 and 54 to be described later in one embodiment.

In starting a cycle, the power is turned on to actuate a conventional cycle control timer 41 having a train of commutator cams which rotate to define a complete cycle, each cam being set to carry out a particular step of the cycle. Thus, as the switch is closed and the cycle control timer is actuated, the die assembly, which is already open, closes via solenoid V1 upon a vane placed in the lower die, the lower die 52 remaining fixed in the raised or home position under the influence of pressure from lower cylinder 45 fed by solenoid actuated valve V3 determined by cycle controller 41, forging pressure being then applied to upper contour die 50 via solenoid actuated valve V2. As the upper die is driven downward under controlled hydraulic pressure, the airfoil section is clamped between the dies 50 and 52, the timer being set to continue the clamping pressure until the airfoil section is reformed. Depending upon the series of vanes being reformed and the particular alloy composition thereof, this is predetermined by a set of preliminary runs.

At the end of a given time period predetermined by the timer, the pressure in the lower cylinder 45 is reduced by actuation of valve V3, thereby allowing upper cylinder 46 to drive both die blocks downward as an assembly at a controlled rate while still maintaining the part under forging pressure. When the buttress of the part reaches locator pad 53 (note also FIG. 5), the vane is pressed against the locator pad set at the attitude desired for orienting the buttress relative to the straightened or reformed airfoil section. The amount of time necessary to achieve the desired orientation is predetermined by the timer. At the end of this step, the press cycle is halted in accordance with the setting on the timer and the assembly allowed to open to enable removal of the part, the timer resetting itself for the next cycle.

When upper die 50 is brought down, clamping pistons 47A and 48A are brought down with it. However, in the aforementioned cycle, upper locator pads 53A and 54A (note dotted lines) are not employed and the clamping assembly does not contact the buttresses.

However, in the alternative embodiment, after the upper and lower dies 50 and 52 are brought in forging contact (note FIG. 6A), one against the other, the lower cylinder 45 is reduced by actuation of valve V3, thereby allowing the upper cylinder 46 to drive both blocks downward as an assembly at a controlled rate while maintaining the part under forging pressure. The movement of the upper die brings with it clamping pistons 47A and 48A (note shoulder 12a in FIG. 1 for moving platen 10 downward) which in turn brings down upper locator pads 53A and 54A, whereby the buttresses are gripped on opposite sides by upper and lower locator pads 54A, 54 on one side and upper and lower locator pads 53A and 53 on the other side to twist the buttress into the correct attitude relative to the airfoil.

The foregoing is shown in FIGS. 6A and 6B. In FIG. 6A, the airfoil is undergoing the forging step. At this point, there is a dwell during which lower locator pad 53 and upper locator pad 53A are spaced away from the buttress 34A. Upon completion of the forging step as determined by the cycle control timer, upper die 50 is caused to move down still further as valve V3 is released, whereby lower die 52 likewise moves down until buttress 34A is gripped between locator pads 53 and 53A to twist the buttress in the correct attitude relative to the straightened airfoil section.

An alloy composition employed in the vane is one containing by weight about 11.0% W, 1.75% Fe, 0.45% C and the balance substantially cobalt. The forging temperature employed for such alloys may range from about 1900° F. to 1700° F. Generally speaking, the forging temperature is maintained at about 1800° F. The upper and lower dies are maintained at a temperature close to that of the vane, that is, from about 1800° F. to 1600° F., generally about 1700° F. The upper and lower dies are preferably made of a heat resistant alloy. The composition of such an alloy is as follows: about 0.6% W, 18.5% Fe, 0.20% C, 9.0% Mo, 1.5% Co, 22.0% Cr and the balance substantially nickel.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method for restoring a distorted vane to its original shape for proper location in a final vane assembly, said vane comprising an airfoil section having locating buttresses at opposite ends thereof which comprises, clamping the airfoil section of a heated vane under pressure between heated opposed dies having contoured working surface defining the desired airfoil shape with the buttresses of said vane extending freely outside the clamped dies until the airfoil thereof has conformed to the airfoil configuration defined by said dies, and then, while maintaining said airfoil section under pressure between the dies, orienting the freely extending buttresses relative to the airfoil section to the attitude required for proper location of the vane in the final vane assembly.

2. A method for restoring a distorted vane to its original shape for proper location in a final vane assembly, said vane comprising an airfoil section having locating buttresses at opposite ends thereof which comprises, clamping the airfoil section of a heated vane under pressure between heated opposed dies having contoured working surfaces defining the desired airfoil shape with the buttresses of said vane extending freely outside the clamped dies, the extent of the closure of the dies being determined by the shape and thickness of the airfoil section, maintaining the pressure on said heated vane until the airfoil thereof has conformed to the airfoil configuration defined by said dies in the clamped position, and then, while maintaining said airfoil section under pressure between the dies, orienting the buttresses relative to the airfoil section to the attitude required for proper location of the vane in the final vane assembly.

3. A method for restoring a distorted vane to its original shape for proper location in a final vane assembly, said vane comprising an airfoil section having locating buttresses at opposite ends thereof which comprises, providing a pair of moveably opposed heated upper and lower contoured dies whose working faces when clamped together define the contour of the desired airfoil shape, said lower die having positioned on each side thereof locator pads for locating and indexing each of said opposed buttresses to the desired attitude during a restoration cycle, placing a heated vane on the heated lower die with the dies in open position and with the buttresses of said vane extending freely outside the confines of said die, said lower die being raised relative to said locator pads to allow clearance between the extending buttresses of the vane and said locator pads, clamping the airfoil section of said heated vane under pressure between said dies, maintaining pressure on the airfoil section until said heated airfoil section has been restored to the desired configuration defined by the contoured dies in the clamped position, causing said clamped dies to move as an assembly towards the lower locator pads until the extending buttresses are pressed against said pads and are oriented to the desired attitude relative to the airfoil section, and then separating the dies and removing the restored vane therefrom.

4. A method for restoring a distorted vane to its original shape for proper location in a final vane assembly, said vane comprising an airfoil section having locating buttresses at opposite ends thereof which comprises, providing a pair of moveably opposed heated upper and lower contoured dies whose working faces when clamped together define the contour of the desired airfoil shape, said lower and upper dies each having positioned respectively on each side thereof upper and lower locator pads for locating and indexing each of said opposed buttresses to the desired attitude during a restoration cycle, placing a heated vane on the heated lower die with the dies in open position and with the buttresses of said vane extending freely outside the confines of said die, said lower die being raised relative to said lower locator pads to allow clearance between the extending buttresses of the vane and said locator pads, said upper die having means associated therewith for supporting said upper locator pads and for bringing said upper locator pads towards said lower pads, clamping the airfoil section of said heated vane under pressure between said dies, maintaining pressure on the airfoil section until said heated airfoil section has been restored to the desired configuration defined by the contoured dies in the clamped position, causing said clamped dies to move as an assembly towards the lower locator pads and bringing said upper locator pads in operable relation with said lower pad until the extending buttresses are pressed between said pads and are oriented to the desired attitude relative to the airfoil section, and then separating the dies and removing the restored vane therefrom.

5. An apparatus for restoring distorted vanes to their original shape, said vanes comprising an airfoil section with locating buttresses at opposite ends thereof which comprises, a pair of oppositely disposed upper and lower dies located one above the other, the working faces of said dies in the clamped closed position defining the desired airfoil configuration, lower buttress-locating pads positioned on each side of said lower die, said pads being located in the path of travel of the vane buttresses during a restoring cycle, the home position of said lower die being slightly above said pads, means for moving said dies relative to each other to a closed position and together as an assembly while in the closed position in the direction of said lower buttress-locating pads, stop means associated with said apparatus for avoiding overriding of said dies during a restoration cycle, and means for applying forging pressure to said dies in the closed position.

6. The apparatus of claim 5, wherein said upper die has upper buttress-locating pads located on each side thereof, said pads being on supports which move downward with said upper die for cooperation with said lower locating pads.

7. The apparatus of claim 5, including a cycle controller with a timing circuit for effecting sequential operation of said restoring cycle, such that when a heated vane is placed in the lower die and the cycle actuated, the dies which are heated are caused to close on said vane, forging pressure is applied for a predetermined time to the vane, the closed die assembly then caused to move towards the lower buttress-locating pads to orient the buttresses of the vane to the correct attitude, following which the dies are actuated to return to their home position for removal of the restored vane from the lower die.

8. The apparatus of claim 7, wherein said upper die has upper buttress-locating pads on each side thereof which cooperate with the lower locating pads when the closed die assembly is caused to move towards said lower locating pads.

References Cited
UNITED STATES PATENTS

| | | | |
|---|---|---|---|
| 1,775,760 | 9/1930 | Harvey | 72—308 |
| 3,094,160 | 6/1963 | Walton et al. | 72—342 |

LOWELL A. LARSON, Primary Examiner

U.S. Cl. X.R.

29—156.8 B; 72—308, 342

UNITED STATES PATENT OFFICE
CERTIFICATE OF CORRECTION

Patent No. 3,621,700     Dated November 23, 1971

Inventor(s) Richard L. Wachtell, et al

It is certified that error appears in the above-identified patent and that said Letters Patent are hereby corrected as shown below:

In the heading to the printed specification, after line 5, insert -- Assignor to Chromalloy American Corporation -- .

Signed and sealed this 10th day of October 1972.

(SEAL)
Attest:

EDWARD M. FLETCHER, JR.  
Attesting Officer

ROBERT GOTTSCHALK  
Commissioner of Patents